INVENTOR.
HEWITT D. CRANE
BY
Christie, Parker & Hale
ATTORNEYS.

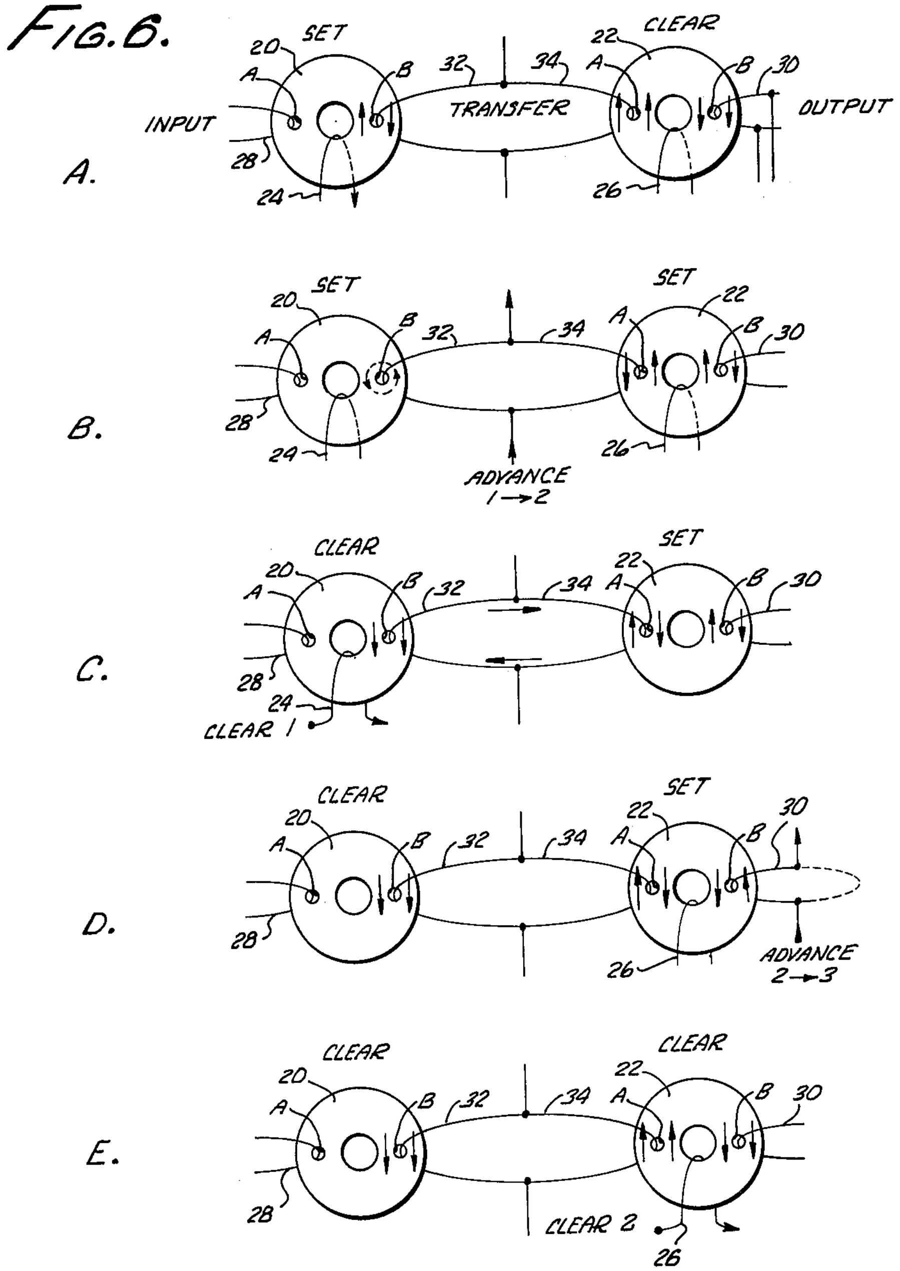
FIG. 6. A. B. C. D. E.
INVENTOR.
HEWITT D. CRANE
BY
Christie, Parker & Hale
ATTORNEYS.

INVENTOR.
HEWITT D. CRANE
BY Christie Parker & Hale
ATTORNEYS

MAGNETIC CORE STORAGE AND TRANSFER APPARATUS

Filed Nov. 20, 1959 4 Sheets-Sheet 4

INVENTOR.
HEWITT D. CRANE
BY
Christie, Parker & Hale
ATTORNEYS.

United States Patent Office 3,204,223

Patented Aug. 31, 1965

3,204,223

MAGNETIC CORE STORAGE AND TRANSFER APPARATUS

Hewitt D. Crane, Palo Alto, Calif., assignor to Burroughs Corporation, Detroit, Mich., a corporation of Michigan Filed Nov. 20, 1959, Ser. No. 854,290

The portion of the term of the patent subsequent to Jan. 24, 1978, has been dedicated and disclaimed 26 Claims. (Cl. 340—174)

This invention relates to binary information storage and transfer apparatus and, more particularly, is concerned with magnetic core pulse operated circuits for storing and controlling the transfer of binary information. This is a continuation-in-part of application Serial No. 698,633, filed November 25, 1957, now abandoned.

The use of magnetic cores having high magnetic retentivity has heretofore been proposed for use as binary information storage means. The fundamental principle of such devices is that the core can be substantially saturated with flux in one direction or the other, the direction of flux being indicative of whether a binary zero or a binary one is stored in the core. Various circuit arrangements have been devised for utilizing this principle in developing memory circuits and logic circuits, with the core as the basic storage unit. One of the limitations of using such a core as a storage element is that in order to read out the stored information, a flux reversal must be effected in the core. This means that at any time information is read out of the core, its binary or bistable condition must be changed, thus altering its original storage condition. Thus, such core circuits are subject to destructive readout, and if it is desired that the information be retained after readout, means must be provided for restoring the condition of the cores following readout.

Another disadvantage of such circuits is that since flux reversals link both input and output windings on the cores, such circuits are subject to back transmission, since any pulsing of the cores results in induced voltages in both the input and output windings. For this reason, diodes are used extensively in magnetic core circuits to provide unidirectional transfer of pulse information. The use of diodes usually further necessitates the use of current limiting resistors to prevent excessive current flow in shunting diodes which otherwise would short circuit core windings. The use of diodes and resistors not only increases the cost of such core circuits, but also greatly increases the power loss and imposes other practical limitations on the use of such circuits.

While core circuits have heretofore been proposed and devised which greatly reduce or obviate the need for diodes, such circuits have not proved very practical in operation. Moreover, such known circuits cannot be used with non-destructive readout since there is close coupling between input and output. Separate input circuits and output circuits cannot be used in combination with one core with independent operation for each input and output circuit.

These disadvantages are avoided by the present invention which utilizes magnetic cores as binary storage elements according to a different principle of operation. As a result of this different principle of operation, cores may be used to store and transfer binary information non-destructively. Information can be transferred from one core to another core unidirectionally without the use of diodes, resistors, or any other fixed, variable, or non-linear impedance elements in the coupling circuits. By means of the present invention, information can be transferred into a magnetic core storage element through any one of a number of selectable input circuits, and may be coupled out of the magnetic core element over any one of a number of selectable output circuits, with no cross-talk or intercoupling between the several input circuits or several output circuits taking place. The basic magnetic core circuit of the present invention may be incorporated in various ways to achieve useful results in binary digital processing circuits. Its most evident utility is in the form of a shift register, but its increased flexibility over other binary storage techniques gives the resulting register circuit unique qualities.

In brief, the invention provides in its elemental form, a pair of core elements which preferably but not necessarily are of annular shape. The core elements are made of magnetic material having a high retentivity. Each of the core elements has an input aperture and an output aperture extending through the core material of substantially smaller size than the opening formed by the annular shape of the core elements. Separate clearing windings link each of the core elements through the central openings thereof, by means of which the core elements may be selectively saturated in response to current pulses passed through the respective clearing windings. An input winding links each core element through the input aperture, and an output winding links each core element through the output aperture, the output winding of one core element being directly connected across the input winding of the other core element, whereby the two windings are connected in parallel. Means is provided for applying a transfer pulse across the two windings in parallel, the transfer pulse being of predetermined magnitude to bring the core elements, when saturated in one direction, just to the threshold level at which flux may start to reverse. In this manner, as will hereinafter be pointed out in detail, the magnetic condition of a cleared core element will be altered or not altered in response to a transfer pulse, depending upon the magnetic condition of the other of the coupled core elements at the time the transfer pulse is applied.

For a more complete understanding of the invention, reference should be had to the accompanying drawings, wherein.

Figures 7, 9:
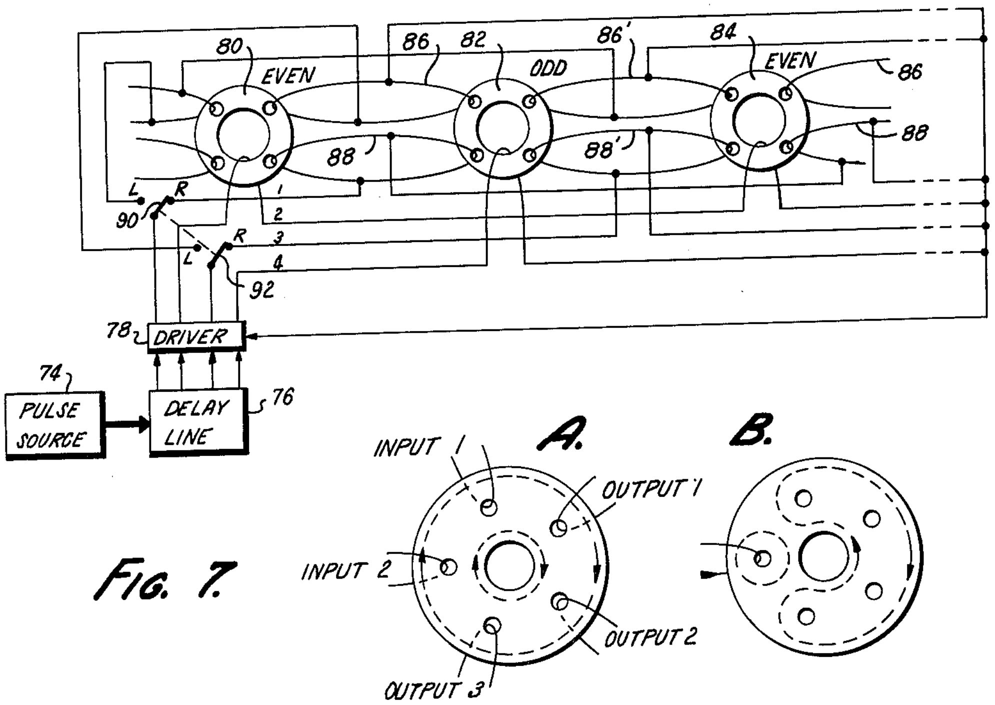
Figure 11:
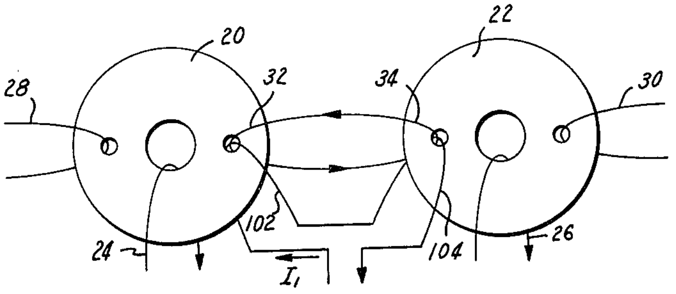
Figure 12:
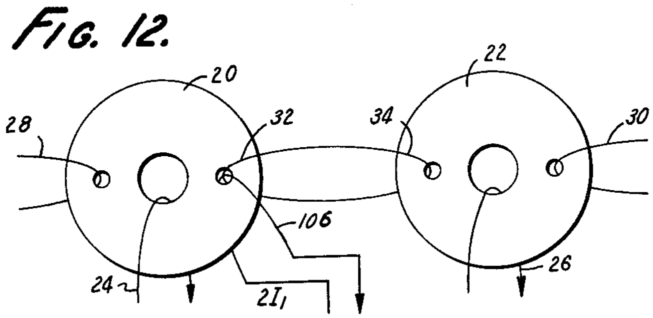
Figure 8:
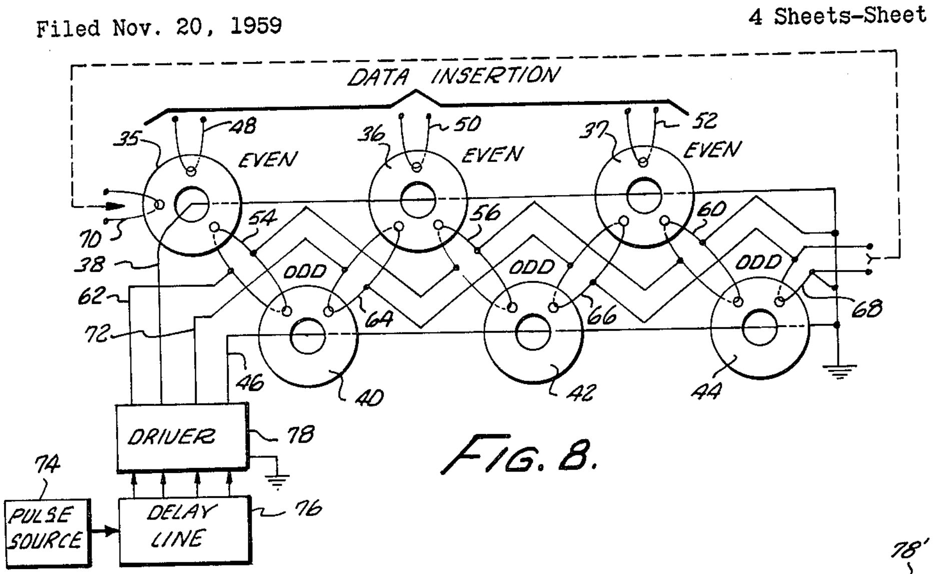
Figure 10:
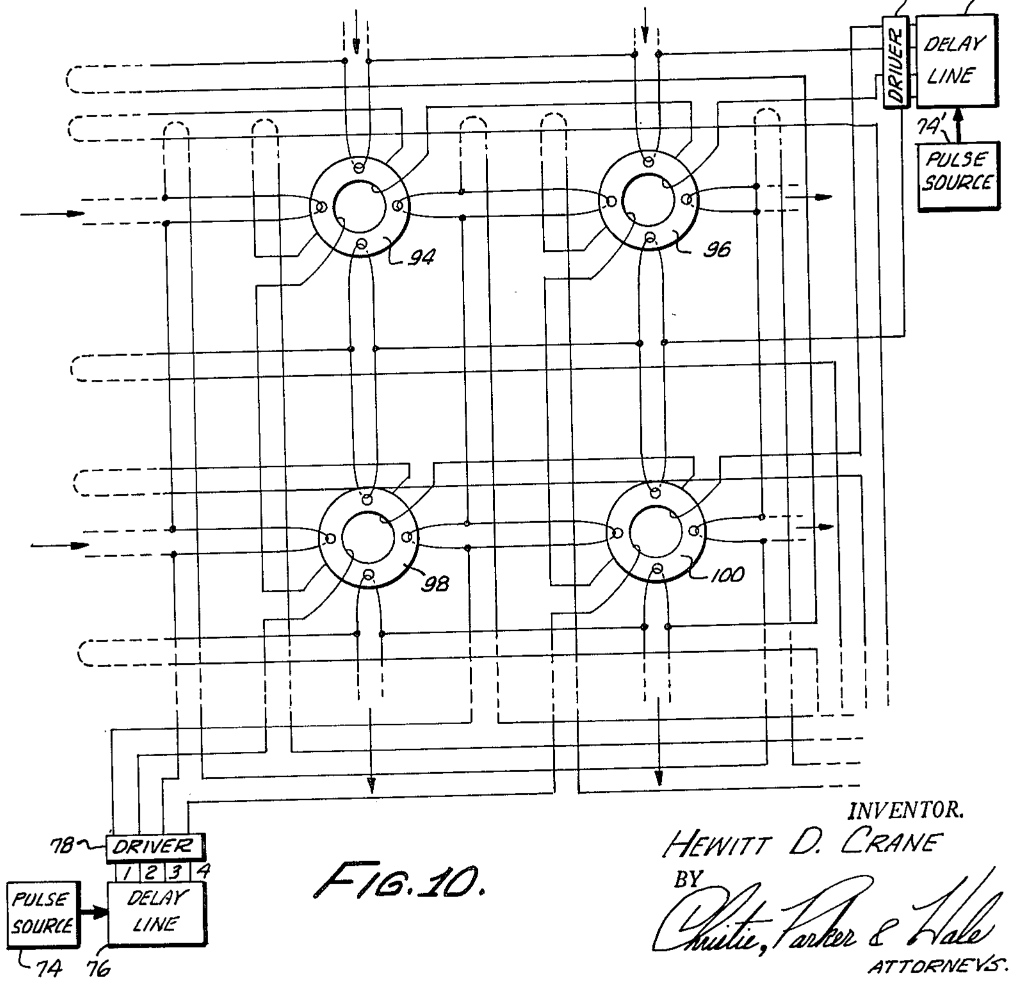

FIGS. 5A–D show a group of multiple-aperture cores of a type which form the basic storage element of the present invention;

FIGS. 6A–E show the basic magnetic core circuit of the present invention under various conditions of operation;

FIGS. 7A–B show a modification of the basic core device which is useful in the present invention;

FIG. 8 shows a shifting register designed according to the principles of the present invention;

FIG. 9 shows a bidirectional shifting register;

FIG. 10 shows a two-dimensional shifting system;

FIG. 11 shows a modification of the transfer circuit linking two magnetic cores as shown in FIG. 6; and FIG. 12 shows a still further modification of the transfer circuit shown in FIG. 6.

Figure 1:
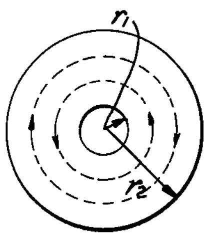
FIG. 1 shows an annular core of ferromagnetic material.
Figures 2, 3:
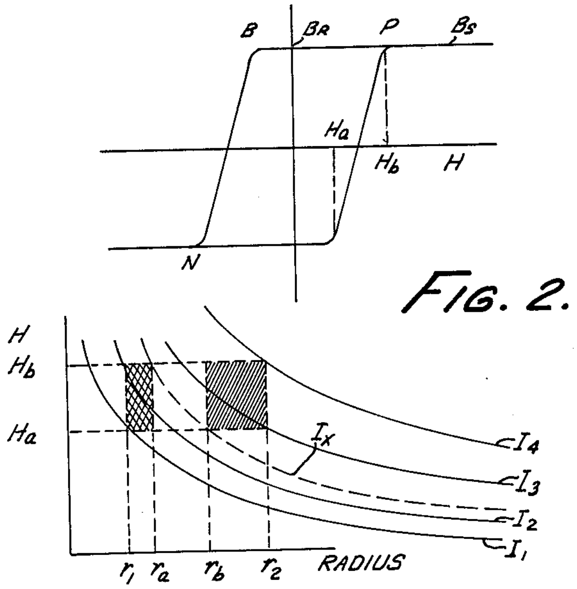
FIG. 2 shows an idealized B—H hysteresis curve for the annular core of FIG. 1.
FIG. 3 is a graphical representation of the field intensity as a function of radius within the core of FIG. 1.

For a better understanding of the principles of the present invention, it is important to understand some of the basic characteristics of magnetic core devices. Consider an annular core as shown in FIG. 1, made of magnetic material having a very high remanent characteristic, i.e., one in which the remanent induction is substantially equal to the saturated induction. Suitable ferromagnetic materials having such characteristics include ferrite and Permalloy. The idealized hysteresis curve for such material is shown in FIG. 2. As can be seen from FIG. 2, the remanent induction $B_r$ after a saturating field is removed, is substantially the same as the saturating inductance $B_s$.

It is known that in a perfectly symmetrical core such as shown in FIG. 1, the field produced by a current passing through the center of the core is a hyperbolic function of $r$. This relation is shown in graphical form in FIG. 3, in which the field H is plotted as a function of the radius $r$ within the core for different values of current I passing through the center of the core. Referring again to FIG. 2, it will be seen that the core completely saturated in one direction, indicated as the N state, an applied field $H_a$ must be applied before the remanent induction can be changed at all and a field $H_b$ must be applied to completely saturate the core in the opposite direction, indicated as the P state.

As shown in FIG. 3, if a current $I_1$ is passed through the center of the annular core of FIG. 1, the core having an inner radius $r_1$ and an outer radius $r_2$, the field at the inside radius $r_1$ is brought to just the field intensity level $H_a$. Thus, if the current $I_1$ is removed, the flux condition of the core will remain unchanged. If a current $I_2$ is passed through the center of the core, the field at the inner radius $r_1$ is brought to the value $H_b$, which is sufficient to completely reverse the flux at this radius to produce saturation in the P state. However, at increasing radii within the core, less and less flux is switched by the applied current $I_2$, according to the relation shown in FIG. 3. Not until the current is increased to a value of $I_3$ is the entire core subjected to at least a field intensity of $H_a$ out to the outer radius $r_2$. Further increase of the current to a level $I_4$ brings the entire core out to its outer radius $r_2$ to a field intensity $H_b$, which is sufficient to reverse the flux in the entire core and bring the entire core to saturation in the P state.

It will be apparent from a study of the curves of FIG. 3 that if a current of some intermediate value $I_x$ is passed through the center of the core, the material from the inner radius $r_1$ to some radius $r_a$, corresponding to the radius at which the current $I_x$ produces a field intensity $H_b$, has been completely switched from state N to state P. In the outer region extending from the radius $r_b$ to the outer radius $r_2$, none of the flux has been switched and the material remains in the state N. However, in an intermediate region from radius $r_a$ to radius $r_b$ there is a transition region. The width of the transition region depends upon the squareness of the hysteresis curve of the particular core material being used. Thus, it will be seen that by carefully controlling the value of the current passed through the center of a core of magnetic material having a high remanence characteristic, regions can be set up in which the flux is saturated in opposite directions, as indicated by the arrows in FIG. 1.

Figure 4:
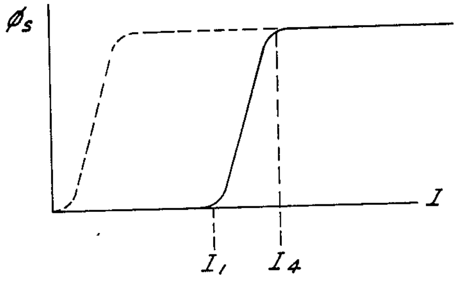
FIG. 4 is a plot of flux switched in the core of FIG. 1 as a function of linking current I.

A typical curve of the amount of flux $\Phi_s$ switched in the core as a function of the driving current I in N turns passed through the center of the core is shown in FIG. 4. It will be seen from the solid line curve that until the current reaches the minimum value $I_1$, corresponding to the threshold field intensity $H_a$ at the inside radius $r_1$ of the core, no flux is switched in the core. When the current increases to a value $I_4$, corresponding to the field intensity $H_b$ at the outer radius $r_2$, all of the flux is switched in the core.

Figure 5:
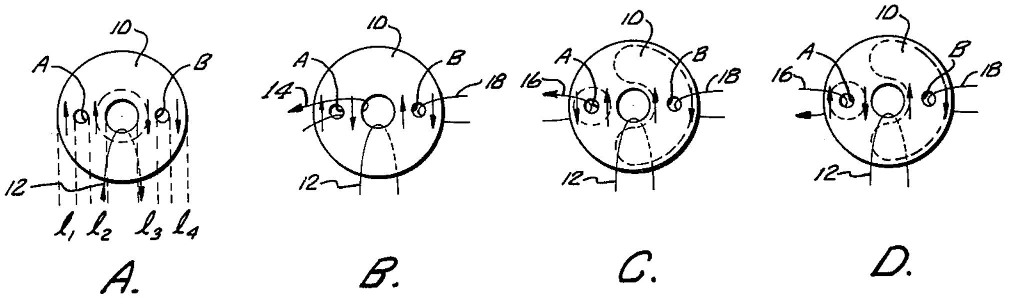

Referring now to FIG. 5, consider an annular core device having a pair of apertures A and B of relatively small diameter extending through the core, dividing the core into four substantially equal legs $l_1$, $l_2$, $l_3$, and $l_4$. If a large current is passed through a conductor 12 passing through the central opening of the annular core 10 in the direction indicated, all four legs of the core will be saturated by flux extending in a clockwise direction in the core. This condition is indicated by the arrows in FIG. 5A.

Consider now a current passed through the aperture A by means of a winding 14 linking the leg $l_2$. If the current is passed in the direction indicated, the resulting field will tend to switch the direction of flux in the leg $l_2$. Since, by definition, any flux that exists must be in a closed loop path, the flux reversal in the leg $l_2$ must be accompanied by an equal amount of flux switched in at least one of the other legs. Since the flux in the leg $l_1$ is already saturated, it cannot accept more flux in the same direction. Thus, the switched flux produced by current in the winding 14 cannot affect the leg $l_1$. However, if the current exceeds a predetermined level, it is possible to switch flux around the central aperture and switch flux in the leg $l_3$. The amount of flux switched in legs $l_2$ and $l_3$ as current is increased in the input winding 14 is represented by the solid curve in FIG. 4; i.e., the current has to increase to a threshold level $I_t$, corresponding to the point $I_1$ in FIG. 3, before flux begins to switch. If the current exceeds a certain value, as the value $I_4$ of FIG. 4, it will be apparent that substantially all of the flux is switched in the legs $l_2$ and $l_3$ about the central aperture of the core 10. There are regions, of course, where the flux is only partially reversed, since a transition zone (as pointed out above in connection with FIG. 3 as lying between $r_a$ and $r_b$) necessarily exists. This does not materially affect the operation and is ignored in the following discussion.

It can be demonstrated that it makes no difference in practice whether the winding 14 links the inner leg $l_2$ or the outer leg $l_1$ of the core 10, the latter arrangement being shown in FIG. 5C. Passing current through a winding 16 linking the outer leg $l_1$ switches flux in the outer leg $l_1$ only if the current is large enough to switch flux in leg $l_3$. The direction of flux resulting from a large current in the winding 16 is shown by the arrows in FIG. 5C. The apparent condition of flux crossing from an outer leg $l_1$ to the inner leg $l_3$ may be interpreted by assuming a resultant flux pattern as indicated by the dotted lines in FIG. 5C. In any event, a winding 18 passing through the aperture B and linking the outer leg $l_4$ has no significant voltage induced in it by the action above described of passing current through the winding 14 of FIG. 5B or the winding 16 of FIG. 5C, since none of the flux linking the winding 18 is reversed.

Once the flux has been switched around the core by current in the input winding, the flux can be switched locally about the input aperture only. Thus, reversing the direction of current merely reverses the direction of flux in legs $l_1$ and $l_2$ as shown in FIG. 5D. It should be noted that the M.M.F. required to switch flux locally about the input aperture, or the output aperture for that matter, is much less than required to switch flux around the central opening of the core. The amount of flux switched as a function of current in such case would be substantially as shown by the dotted curve of FIG. 4. It will be seen that the threshold current at which flux starts to switch is much lower than the condition represented by the solid curve.

At this point, it is helpful to define certain terms used to describe the conditions of the magnetic core devices as described in connection with FIG. 5. The pulse passed through the winding 12 which links the central aperture of the core, in saturating the flux in the core in the clockwise direction, is said to "clear" the core. Thus, the core device as shown in FIG. 5A is said to be cleared. When a large current is applied to the winding linking the aperture A, such as the winding 16 in FIG. 5C, resulting in a reversal of flux in the leg $l_3$, the core device is said to be in its "set" condition.

The aperture A is generally referred to as the setting or input aperture, while the aperture B is referred to as the reading or output aperture. With the core device in its cleared state, the input aperture is referred to as "settable," but when the core device is in its set condition, the input aperture is said to be "not settable," the reason being that once the core device is in its set condition, the current pulses applied to the input winding 16 no longer have any significant effect on the flux condition of the output aperture B. This can be appreciated by considering FIG. 5D, which shows current being applied to the input winding 16 in the opposite direction for a magnetic core device which is in its set condition. It will be readily apparent that the flux in legs $l_1$ and $l_2$ is reversed without effect on the flux condition in the legs $l_3$ and $l_4$. Thus, once the core device is in its set condition, pulses applied to the input winding only result in a local flux reversal in closed flux paths around the setting aperture A.

With the core device in the cleared condition, the output aperture B is said to be "blocked." This is because the flux around the output aperture B in legs $l_3$ and $l_4$ cannot be switched locally. However, once the core device is set, then the output aperture B is said to be "unlocked," since the flux can be switched locally about the aperture B without affecting the rest of the core. It should be noted that even though an output aperture is blocked, it is still possible to switch flux about the central aperture with a large enough reading current. If the reading current applied to the output winding 18 is large enough to exceed the threshold level $I_t$ for switching flux around the central aperture, it can result in flux being switched in the same manner that a large current applied to the input winding 16 causes flux to be switched, as decsribed above in connection with FIG. 5C. Reversal of flux in a blocked output aperture by a large current applied thereto is referred to as "spurious unblocking."

The above-described characteristics of a multiple-aperture core device are utilized in the present invention to provide a novel core circuit by means of which binary information may be transferred from one core to another with a non-destructive readout and without the need for unilateral or other special electrical impedance devices in the transfer circuit. The present invention is illustrated in its elemental form in FIG. 6. As shown there, the circuit comprises at least two ferromagnetic core devices 20 and 22, the core device 20 being considered the transmitter and the core device 22 the receiver. The core device 20 is preferably annular in shape with a central opening linked by a "clear" winding 24. The core device 22 is similarly linked through its central opening by "clear" winding 26. The input or setting aperture of the core device 20, indicated at A, is linked by an input winding 28 and the output aperture of the core device 22, indicated at B, is linked by an output or feeding winding 30. The output aperture B of the core device 20 and the input aperture A of the core device 22 are linked by a pair of windings 32 and 34 respectively, which are connected in parallel to form a closed loop across which a transfer pulse may be applied.

Consider first that pulses are applied to the clearing windings 24 and 26 so that both the core devices 20 and 22 are in their cleared condition; i.e., all the flux is saturated in a clockwise direction. If then a transfer pulse is applied to the transfer coupling loop between the two core devices, current divides between the winding linking the output aperture B of the core device 20 and the winding linking the input aperture A of the core device 22.

While the figures thus far described have shown for the sake of simplicity only a single turn of wire passing through the apertures, it has been found desirable that the output winding 32 has more turns than the input winding 34 to make up for losses in the transfer loop. The wire resistances are controlled to divide the current I, with both the core device 20 and the core device 22 cleared, so that the ampere turns in the windings 32 and 34 are substantially equal. Moreover, the transfer pulse current is controlled so that the ampere turns in the respective windings produce a field of value $H_t$, which corresponds to the threshold M.M.F. required to switch flux about the large central aperture of the core devices. As explained above, the threshold level is indicated by the current value $I_t$. It will be seen that with both of the core devices in their cleared condition, no flux change is effected in either of the cores, since the current divides between the two windings. If the cleared condition represents the binary digit zero, it will be seen that if a zero has been stored in the core device 20, the application of a transfer pulse leaves the core device 22 with a binary zero stored thereon, since the current pulse is insufficient to switch flux in either core.

Consider the operation of the circuit as shown in FIG. 6A–E, however, if the core device 20 is in its set condition, i.e., has a binary digit one stored in it. This is the condition illustrated in FIG. 6A. If now the same transfer pulse is applied to the windings 32 and 34 in parallel, an entirely different result takes place. Because the output aperture B of the core device 20 is now unblocked, local flux reversal about the output aperture B of the core device 20 takes place because the current is obviously above the threshold at which flux is switched locally about the aperture. The local reversal of flux induces a voltage in the transfer loop which opposes the flow of current due to the transfer pulse in the winding 32, but reinforces the flow of current due to the transfer pulse in the winding 34. As a result, the M.M.F. generated in the setting winding of the core device 22 is raised considerably above the threshold level $H_t$ so that the core device 22 is set in response to the transfer pulse. This condition is shown in FIG. 6B.

It is apparent then that by the application of the transfer pulse, the core device 22 is changed from its cleared state to its set state when the core device 20 is initially in its set state. This transfer does not affect the condition of the core device 20 except for the local flux reversal about the output aperture B. The core is not restored to its cleared or binary zero condition. In other words, there is no destruction of the condition of the core from which information is being read.

Once the binary one digit stored in the core device 20 is transferred to the core device 22, a clearing pulse may be applied to the winding 24 to clear the core device 20, if desired, so that it can receive the next binary digit.

This is shown in FIG. 6C. It will be noted that the clearing of the core device 20 causes a flux reversal in the leg linked by the winding 32. This induces a voltage across the winding 32, causing a current to flow in the winding 34. This in turn produces a local flux reversal about the input aperture of the core device 22.

FIGS. 6D and E illustrate that the receiver core device 22 can then serve as a transmitting core device for further transfer along a chain without influencing the original transmitter core device 20. If an advance pulse is applied across the output winding 30, the flux is reversed locally about the output aperture of the core device 22. This does not result in flux being switched adjacent the input aperture, so no voltage is induced in the transfer loop linking the core devices 20 and 22. Moreover, clearing of the core device 22, as shown in FIG. 6E, while reversing flux around the central aperture of the annular core device 22, does not switch any flux in the leg linked by the winding 34. So again, no voltage is induced in the transfer loop linking the core devices 20 and 22.

The core devices, as described in connection with FIG. 5, are not limited to having a single input aperture and a single output aperture. A number of input apertures and output apertures may be spaced around the core, as shown in FIG. 7. Here two input apertures and three output apertures are shown by way of example. With the core in its cleared condition as shown in FIG. 7A, either one of the input apertures is settable and all of the output apertures are blocked. If a pulse is applied to the Input 2 winding, the setting current results in a flux pattern as shown in FIG. 7B. As a result, the two input apertures are no longer settable, and the three output apertures are unblocked. It will be noted that a setting current applied to any of the input windings induces no signal in the output windings or other input windings.

The transfer circuit illustrated in connection with FIG. 6 may be incorporated in a shift register circuit, resulting in a circuit consisting entirely of core devices and wire without any other circuitry except for the driving circuits. Such a shifting register is shown schematically in FIG. 8. In any shifting register, a number of digit storage positions are provided. Digital information may be fed into the register serially or in parallel. Digits comprising a word stored in the register may be transposed or shifted from one storage position to the next, with the digit in the output end storage position either being shifted out or recirculated back to the input storage position.

It is inherent then, in any shifting register, that in addition to the digit storage devices, temporary storage means be provided for temporarily storing the digits in the shift register during the shifting operation while the digit storage devices are cleared. In electronic shifting register circuits, the temporary storage may be provided by a delay circuit between each of the digit storage devices. The delay in the transfer of digital information from storage device to storage device provides a time interval during which the storage devices are cleared.

In storage registers using core devices, such as the shift register described in Patent No. 2,708,722 to An Wang, it has been customary to use two core elements for each digit position in the shifting register. Information is normally stored in one set of cores and during the shifting operation the digits are temporarily stored in the other set of cores while the first set of cores is cleared. This principle is used in the shifting register circuit as shown in FIG. 8, the two sets of cores being designated "even" and "odd" respectively.

Each of the even cores, three of which are shown by example at 35, 36 and 37, is linked through its central opening by a clearing winding, the respective clearing windings being connected in series to form a continuous conductive path as indicated by the conductor 38. Each of the odd cores, indicated at 40, 42 and 44 respectively, are similarly provided with a clearing winding, the respective clearing windings being connected in series to form a single conductive path, as indicated by the conductor 46. Data may be inserted in the even core elements by separate input windings 48, 50 and 52, if so desired. Thus, any one or all of the even cores may be set to store a binary digit one by pulsing the respective data insertion windings. Transfer windings link output apertures of the even core elements with input apertures of respective ones of the odd core elements, as indicated at 54, 56 and 60. Each of these transfer loops may be simultaneously pulsed by connecting them serially in a common current conductive path 62. Similarly, each of the output apertures of the odd core devices are coupled by transfer loops to the input apertures of the even core devices by transfer windings and coupling loops 64 and 66. If recirculation of the stored information in the shifting register is desired, the winding coupled to the output aperture of the odd core element 44 may be connected back to the input winding of the first even core device 35. The transfer loops 64 and 66 and the output winding 68 are connected in series circuit to form a common current path through a conductor 72.

Shifting of binary information from one even core device to the next even core device requires four pulses: two clearing pulses for the respective clearing windings of the even core devices and the odd core devices, and a pair of transfer pulses for transferring from even to odd and odd to even of the core devices respectively. These four pulses may be derived in sequence from a clock pulse source 74 which is coupled to a tapped delay line 76 or other suitable means for deriving four spaced pulses on separate outputs. Four pulses are derived in time sequence from the delay line 76 in response to each pulse from the source 74. These pulses are properly shaped and amplified to the desired level in a driver circuit 78 and coupled respectively to the conductors 62, 38, 72 and 46. The driver circuit includes four separate channels of amplification, one for each of the outputs from the delay line 76.

In operation, with all the odd core devices in their cleared condition, it will be seen that the first pulse applied to the conductor 62 transfers a set condition to any of the odd core devices associated with an even core device which has been initially set in response to the insertion of a binary one. The next pulse from the driver 78, applied to the conductor 38, clears all the even core devices. The following pulse derived from the driver 78 is applied to conductor 72 and sets all the even core devices associated with odd core devices which were set in response to the pulse over the conductor 62. The odd core devices then are all cleared by the last pulse derived over the conductor 46 from the driver 78. Thus, in one cycle of operation, corresponding to one pulse from the source 74, the condition of each of the respective even core devices is transferred to the next successive even core device, in the manner characteristic of the operation of a shifting register.

As pointed out heretofore, in order to compensate for losses in the transfer loop, it has been found desirable that the winding linking the output aperture of the transmitting core should have a greater number of turns than the winding linking the input aperture of the receiving core. For example, a transfer loop having six turns linking the output aperture of the transmitting core and five turns linking the input aperture of the receiving core has been found to give the required amount of flux gain to compensate for losses in the transfer loop. The result is that the flux level in the respective loops in the chain is substantially maintained at the same level as the set condition is transferred from core to core.

Because of the 6:5 turns ratio, the shifting register circuit of FIG. 8 is not symmetrical, and transfer of information may be effected in one direction only. A bidirectional shift register may be provided, however, as shown in FIG. 9, by utilizing cores having at least four apertures, in accordance with the principle as set forth above in connection with the multiple-aperture core of FIG. 7. Thus, each of the cores, such as indicated at 80, 82 and 84 in FIG. 9, is provided with four apertures by means of which pairs of transfer loops 86, 86', and 88, 88' may be accommodated between adjacent cores. A single clearing winding is provided on each core, the clearing winding on alternate cores being connected in series exactly as described in connection with FIG. 8. The two sets of clearing windings are pulsed from a delay line 76 driven from the pulse source 74, the same as in FIG. 8, whereby the even cores and the odd cores are alternately cleared.

The transfer loops 88, 88' are wound with the resulting turns ratio of the respective windings at each transfer loop being arranged for transfer from left to right. All the transfer loops 88 are connected in series back to the delay line 76 through a switch 90. Similarly, all the transfer loops 88' are connected in series back to the delay line 76 through a switch 92, the switches 90 and 92 being ganged together. It will be seen that with the switches in the positions shown in FIG. 9, the transfer loops are actuated in sequence in relation to the clearing windings of the cores to effect transfer of information from left to right in the identical manner as described above in connection with FIG. 8.

Transfer loops 86, 86' have the turns ratio of the windings arranged for transfer from right to left. The transfer loops 86 are connected in series to the delay line 76 through the switch 92, while the transfer loops 86' are connected in series to the delay line 76 through the switch 90. With the switches 90 and 92 thrown to the opposite position as that shown in FIG. 9, transfer takes place by means of the transfer loops 86, 86' in a direction from right to left. Thus, simply by changing the switches 90 and 92, the shifting in the register of FIG. 9 can be made to take place selectively in either direction in the register. It will be appreciated, however, that the pulses required to advance in opposite directions may be derived from independent sources if so desired.

The transfer principle of the present invention may be applied to multidimensional arrays, such as the two-dimensional array shown in FIG. 10. In this circuit just four cores, indicated at 94, 96, 98 and 100, are shown by way of example, but any number of cores may be used as required. Information is transferred from left to right simultaneously in each horizontal row of cores by means of pulses derived from the source 74 through the delay line 76 and driver 78, the first pulse from the delay line 76 being applied to the transfer loops coupling the cores 94 and 96 and the cores 98 and 100 respectively. The next pulse from the delay line 76 clears each of the cores in the first column, namely, cores 94 and 98. The next pulse from the delay line 76 is applied to the transfer loops for transferring information into the cores 94 and 98, and out of the cores 96 and 100. The next pulse, in the complete cycle of four pulses, clears all the cores in the second column, namely, cores 96 and 100. Thus, it will be recognized that each horizontal row of cores in the array is driven from the pulse source 74 and delay line 76 in exactly the same manner as the shift register as described in connection with FIG. 8. Successive cores in each row constitute the even and odd cores of the parallel rows of registers.

Information can be shifted from the top row in parallel to lower rows in the same manner from a pulse source 74', pulse delay line 76', and driver 78'. The first pulse from the delay line actuates the transfer loops between the cores 94 and 98 and the cores 96 and 100 respectively. The next pulse from the delay line 76' clears the cores 94 and 96 in the first row of cores. The next successive pulse from the delay line 76 actuates the transfer loops for transferring information into the cores 94 and 96, and transferring information out of the cores 98 and 100. The last pulse in the succession of four pulses derived from the delay line 76' clears the second row of cores 98 and 100. Thus, the cores in each of the vertical columns operate in response to the pulse source 74' in the identical manner as the shift register described in connection with FIG. 8, successive cores being designated even and odd respectively in the parallel columns of the register.

While a separate pulse source and delay line has been indicated for shifting from left to right horizontally and for shifting down in the vertical columns, it will be understood that one pulse source, delay line and driver may be used with suitable switching for driving the array, separate pulse sources and delay lines being shown for the sake of clarity of operation only. As indicated by the dotted lines, the array may be extended in either of the two dimensions to provide additional cores in the rows and columns of the array. It will be further appreciated that three-dimensional arrays are possible by which information can be shifted in parallel in any one of three directions if so desired. Furthermore, the bidirectional arrangement of FIG. 9 can be applied to the multiple-dimension arrays to achieve bidirectional shifting in several dimensions.

An alternative transfer circuit drive arrangement is shown in FIG. 11, in which transformer action is used to inductively couple a transfer current in the coupling loop between cores in place of the direct coupling as described in connection with FIG. 6. In the arrangement shown in FIG. 11, the core elements 20 and 22 are coupled by a closed conductive loop linking the small apertures in identical fashion as described above in connection with FIG. 6. However, the drive current is provided through a second circuit which includes a winding

102 linking the output aperture of the transmitting core element 20 and the winding 104 linking the input aperture of the receiving core element 22. The windings 102 and 104 are connected in series and an advance current applied thereto in the direction indicated by the arrow.

The advance current passes through the winding 102 in a direction such as to induce flux in an upward direction in the outer leg of the transmitting core element 20 linked by the winding 102. Current passes through the winding 104 in a direction to tend to induce flux in a downward direction in the outer leg linked by the winding 104 in the receiving core element 22. The advance current pulse is limited to a current level in each of the windings below the threshold required to switch flux around the long path in the respective core elements when the apertures are in the blocked condition. With the apertures blocked, substantially no current is induced in the coupling loop by the advance current pulse.

If the output aperture of the transmitting core 20 is unblocked, however, corresponding to storage of the binary one condition, application of an advance pulse through the winding 102 develops sufficient M.M.F. to cause flux to switch in the small flux path around the output aperture. As a result, by transformer action, a substantial current is induced in the coupling loop in a direction through the input operation of the receiving core 22 to aid the advance current in switching flux around the receiving core. Thus, the total current passing through the input aperture of the receiving core element 22 through the winding 104 and the coupling loop winding exceeds the threshold required to switch flux around the long flux path in the receiving core element 22. As a result, the output aperture of the receiving core element 22 is unblocked and the resulting flux condition corresponds to the set or binary one condition following the transfer pulse. Thus, it will be appreciated that the operation of the circuit of FIG. 11 is substantially the same as that shown in FIG. 6, except that advance current in the coupling loop is produced by transformer action rather than by direct coupling from the advance current source.

A still further modification is shown in FIG. 12. Here, the advance current is passed through only one of the apertures linked by the closed transfer coupling loop. Thus, a winding 106 is shown in FIG. 12 as linking the output aperture of the transmitting core element 20. An advance current somewhat less than twice the threshold required to switch flux around the long path of the core element is pulsed through to the winding 106.

With the output aperture of the transmitting core blocked, the drive current can only switch flux around the long path. As flux begins to switch, a current is induced in the coupling loop. The current in the coupling loop tends to switch flux around the long flux path of the receiving core element. However, the M.M.F. produced by current pulse through the drive winding is insufficient to switch appreciable flux around the long flux paths of both the core elements. As a result, the core elements, when in the binary zero state, are substantially unaffected by the drive pulse. What little flux is switched in exciting the coupling loop is immaterial since the transmitting core is immediately cleared by the next clearing pulse.

On the other hand, if the output aperture of the transmitting core 20 is unblocked, flux is readily switched around the small aperture by the advance current applied to the winding 106 since the advance current pulse is substantially above the threshold required to switch flux around the smaller flux path. As a result, a fairly large current is induced in the closed coupling loop winding in a direction to switch flux around the long flux path in the receiving core element 22. Thus, the application of the transfer pulse to the winding 106 results in the output aperture of the receiving core element 22 remaining blocked or being set, depending upon whether the output aperture of the transmitting core element 20 is blocked or set.

In theory, it makes no difference whether the advance current winding 106 links the output aperture of the transmitting core element or links the input aperture of the receiving core element. In either event, appreciable flux is switched around the long flux path in the receiving core element only if the output aperture of the transmitting core element is unblocked.

In all of the modifications described above in connection with FIGS. 6, 11 and 12, an advance current pulse of slightly less than twice the threshold required to switch flux around the long flux path of one core element is applied. (In FIG. 11, a threshold current is applied to two series windings, making an equivalent total current of twice threshold.) The advance current divides between the two core elements when both are in the binary zero condition, so as not to exceed threshold in either core element. Hence, little flux is switched in either core element. However, the advance current, by means of the coupling loop, divides unequally between the two core elements when the transmitting core element is in the binary one condition with the output aperture unblocked. This unequal division of current results in threshold being exceeded in the receiving core element for setting the output aperture to the binary one condition.

From the above description, it will be recognized that an improved transfer circuit for use with magnetic cores has been provided by the present invention. Binary information stored in cores can be read out and transferred to other cores without destroying the information during the readout process. No diodes or other impedance elements are required in the transfer circuit. Since circuits utilizing the transfer principles of the present invention require only magnetic cores and wire conductors, considerable savings in costs of building the circuits can be realized. Moreover, the driving circuitry required is greatly simplified.

Other advantages may be found in the fact that the present system is inherently of high efficiency, since essentially the only losses are in the resistance of the connecting wires. Thus, driving circuits of smaller capacity can be used, and cooling problems of the associated circuitry are greatly diminished. Moreover, the amount of wire can be considerably reduced in the present system since relatively few turns are required per winding. This is in contrast to prior core circuits using diodes, in which a high number of turns are required in order to minimize diode losses by making the transmission system operate at high voltage and low current.

It should be noted that while a specific type of core configuration has been shown, it is not essential to the invention that the core be toroidal in shape. Moreover, the extra apertures may be extended through the annular core at essentially any angle and not merely parallel to the core axis as shown, and may be spaced in random fashion as long as the spacing between apertures is not substantially less than the radial thickness of the core less the diameter of the aperture.

What is claimed is:

1. Apparatus comprising at least two storage elements, each element including an annular core of magnetic material having a substantially rectangular hysteresis loop, the core of each storage element having at least two apertures therethrough which are of substantially smaller size than the central opening formed by the annular shape of the core, a clearing winding linking the core through the central opening thereof for saturating the core in response to a unidirectional current passed through the clearing winding, an input winding linking the core through one of said apertures, and an output winding linking the core through the other of said apertures, the output winding of one core being directly connected across the input winding of the other core whereby the two windings are connected in parallel to form a closed conductive loop, and means for coupling a transfer pulse through the two windings, the transfer pulse being of predetermined magnitude to bring the cores when saturated by the clearing winding to the threshold level at which flux starts to reverse in the cores, whereby the pulse does not materially alter the flux condition of the cores when they are both saturated by the respective clearing windings.

2. Apparatus comprising at least two storage elements, each element including a magnetic core having a substantially rectangular hysteresis loop, the core of each storage element having at least three openings therethrough, the openings separating the core into four separate core legs, the closed flux path linking the first and second of the core legs and the flux path linking the third and fourth of the core legs being substantially shorter than any other flux paths linking the respective legs of the core, an input winding linking the core through a first one of said openings and being wound on a first one of said legs, an output winding linking the core through a second one of said openings and being wound on a second one of said legs, a clearing winding linking the core through a third one of said openings and wound on a portion of the core of larger cross-sectional area than any of said legs, means for pulsing a unidirectional current through the third winding of sufficient magnitude to saturate the flux in each of said legs, the output winding of one core being directly connected across the input winding of the other core in parallel whereby the two windings form a closed loop conductive path, and means for applying a transfer pulse through the two windings, the transfer pulse being of predetermined magnitude to bring the cores when saturated by the clearing winding to the threshold level at which flux starts to reverse in the cores, whereby the pulse does not materially alter the flux condition of the cores when they are both saturated by the respective clearing windings.

3. Apparatus comprising at least two storage elements, each element including a magnetic core having a substantially rectangular hysteresis loop, the core of each storage element having at least three openings therethrough, the openings separating the core into four separate core legs, an input winding linking the core through a first one of said openings and being wound on a first one of said legs, an output winding linking the core through a second one of said openings and being wound on a second one of said legs, a clearing winding linking the core through a third one of said openings and wound on a portion of the core of larger cross-sectional area than any of said legs, means for pulsing a unidirectional current through the third winding of sufficient magnitude to saturate the flux in each of said legs, the output winding of one core being directly connected across the input winding of the other core in parallel whereby the two windings form a closed loop conductive path, and means for applying a transfer pulse through the two windings, the transfer pulse being of predetermined magnitude to bring the cores when saturated by the clearing winding to the threshold level at which flux starts to reverse in the cores, whereby the pulse does not materially alter the flux condition of the cores when they are both saturated by the respective clearing windings.

4. Apparatus for storing and transferring binary information comprising at least two magnetic cores having a substantially rectangular hysteresis loop, each of the cores being annular in shape and having at least one input aperture and one output aperture extending through the core material of smaller size than the opening formed by the annular core, an input winding linking the input aperture of the first core, an output winding linking the output aperture of the second core, a transfer loop including a winding linking the output aperture of the first core and a winding linking the input aperture of the second core, the windings being directly connected in parallel to form the closed loop, means for applying a transfer pulse across the loop between the two windings whereby a current is provided simultaneously through the two windings, the current dividing between the two windings according to the respective impedance of the two windings, the magnitude of the pulse being insufficient to reverse a substantial amount of flux in either core in a path around the opening formed by the annular core when the flux in the cores has been saturated.

5. Apparatus for storing and transferring binary information comprising at least two magnetic cores having substantially rectangular hysteresis loops, each of the cores being annular in shape and having at least one input aperture and one output aperture extending through the core material, the apertures being of smaller size than the opening formed by the annular core, an input winding linking the input aperture of the first core, an output winding linking the output aperture of the second core, a transfer loop including a winding linking the output aperture of the first core and a winding linking the input aperture of the second core, the windings being directly connected in parallel to form the closed loop, and means for applying a transfer pulse across the loop between the two windings whereby a current is provided simultaneously through the two windings, the current dividing between the two loops according to the respective impedances of the two windings.

6. Transfer apparatus comprising a first annular core of magnetic material having a substantially rectangular hysteresis loop and having an aperture in a portion of the core dividing the core into two branches positioned on either side of the aperture, means for setting the flux in the two branches in the same direction, means for setting the flux in the two branches in opposite directions, the two conditions of flux in the branches representing two stable binary states, a second core of magnetic material having a substantially rectangular hysteresis loop and having two apertures in spaced portions of the core, each aperture dividing the core into two parallel flux branches on either side of the respective apertures, a closed bidirectionally conductive transfer loop including a first winding wound on one branch of the first core, the first winding linking the branch by passing through said aperture in the first core, and a second winding wound on one branch formed by one of the apertures of the second core, the second winding linking the branch by passing through said one of the apertures in the second core, means for setting the flux in the two branches formed by the other aperture in the second core in the same direction, and means for transferring the flux condition in the two branches formed by the aperture in the first core to the two branches formed by said other aperture in the second core, said transfering means including means for applying a pulse through the two windings in the transfer loop, the pulse producing a flow of unidirectional current in the two windings, the magnitude of the pulse being such that the current produced in the two windings is slightly less than the amount of current required to produce flux reversal in either core when the flux is in the same direction in the respective pairs of branches formed by the two apertures linked by the transfer loop but more than the current required to produce flux reversal in either core when the first core is set with the flux in opposite directions in the pair of branches formed by the aperture linked by the transfer loop.

7. Transfer apparatus comprising a first annular core of magnetic material having a substantially rectangular hysteresis loop and having an aperture in a portion of the core dividing the core into two flux branches positioned on either side of the aperture, means for setting the flux in the two branches in the same direction, means for setting the flux in the two branches in opposite directions, the two conditions of flux in the branches representing two stable binary states, a second core of magnetic material having a substantially rectangular hysteresis loop and having two apertures in spaced portions of the core, each aperture dividing the core into two parallel flux branches on either side of the respective apertures, a closed bidirectionally conductive loop including a first winding wound on one branch of the first core, and a second winding wound on one branch formed by one of the apertures of the second core, means for setting the flux in the two branches formed by the other aperture in the second core in the same direction, and means for transferring the flux condition in the two branches formed by the aperture in the first core to the two branches formed by said other aperture in the second core, said transferring means including means for coupling a pulse of predetermined magnitude through the two windings in the transfer loop.

8. Apparatus comprising a first core of magnetic material having a substantially rectangular hysteresis loop and forming a closed loop magnetic circuit and having an input aperture and an output aperture, each of the apertures dividing the closed loop magnetic circuit of the first core into two flux branches, a clearing winding wound on the first core for saturating the flux in the core in one direction around the loop in response to a unidirectional current passed through the winding whereby the flux in the respective branches is in the same direction when the first core is cleared, an input winding passing through the input aperture and linking one branch of the core formed by the input aperture for reversing the flux in said one branch in response to a unidirectional current passed through the input winding whereby flux in the two branches formed by the output aperture is in opposite directions, an output winding passing through the output aperture and linking one branch of the core formed by the output aperture, a second core of magnetic material having a substantially rectangular hysteresis loop and forming a closed loop magnetic circuit and having an input aperture and an output aperture, the apertures each dividing the closed loop magnetic circuit of the second core into two branches, a clearing winding wound on the second core for saturating the flux in the second core in one direction around the loop in response to a unidirectional current passed through the clearing winding, whereby the flux in each of the respective branches is oriented in the same direction when the second core is cleared, an input winding passing through the input aperture of the second core and linking one branch of the second core formed by the input aperture, the output winding of the first core and the input winding of the second core being directly connected in parallel, and means applying a transfer pulse of predetermined magnitude through the two windings, the pulse producing a flow of unidirectional current in the two parallel windings, the magnitude of the pulse being such that the current produced in the two windings is just slightly less than the amount of current required to produce substantial flux reversal around the closed loop magnetic circuit of either core when the cores are cleared with all the flux in the same direction in the respective branches of the two cores.

9. A shift register comprising a plurality of annular cores of magnetic material having a substantially rectangular hysteresis loop, each of the cores having at least two small apertures extending through the core, each aperture defining two separate legs in the core for the passage of flux, transfer loops linking the cores, each transfer loop including windings wound around one leg only of each of two cores, the legs being linked by passing the windings through one of said apertures of each of the associated cores coupled by a transfer loop, a clearing winding wound on each core and linking the core by passing through the central opening formed by the annular core, means for simultaneously pulsing the clearing windings of alternate cores with sufficient current to saturate the flux in the cores in one direction, means for simultaneously pulsing the clearing windings of the remaining cores with sufficient current to saturated the flux in the cores in one direction, means for simultaneously pulsing the coupling loops linking alternate pairs of cores with a unidirectional current, the current being of a magnitude to bring the cores just below the threshold magnetizing level at which the direction of flux in associated cores begins to reverse when the associated cores are in a saturated condition with all the flux in one direction, means for simultaneously pulsing the remaining coupling loops with a unidirectional current of a magniutde to bring the cores to said threshold magnetizing level when the associated cores are in a saturated condition with all the flux in one direction, and means responsive to a shifting pulse for successively actuating each of said pulsing means.

10. A shift register comprising a plurality of annular cores, the cores being of magnetic material having a substantially rectangular hysteresis loop, each of the cores having at least a pair of apertures in the core, each of the apertures dividing the cores in the region of each of the respective apertures into two flux branches, a plurality of current conductive coupling loops linking the cores in a series configuration, each pair of adjacent cores having a single coupling loop therebetween, said coupling loop including a pair of windings in parallel, each winding linking one of the two branches formed by an aperture in the associated core by passing the turns of the winding through the aperture, a clearing winding on each of the cores, the clearing winding linking the associated core through the opening formed by the annular shape of the core, shifting pulse generating means for generating four successive output pulses per shifting cycle respectively on four separate outputs, means for coupling the clearing windings of alternate cores to the second one of said ouputs to be pulsed, means for coupling the clearing windings of the remaining cores to the fourth one of said outputs to be pulsed, means for coupling alternate coupling loops to the first one of the outputs to be pulsed, and means coupling the remaining coupling loops to the third one of the outputs to be pulsed.

11. A multi-dimensional shift register comprising a plurality of annular magnetic cores having a substantially rectangular hysteresis loop, each core having at least four apertures, a plurality of bidirectionally conductive coupling loops, the coupling loops being arranged to link each core with four other cores for forming a two-dimensional array of cores, each coupling loop linking one aperture in each of two adjacent cores in the array, whereby the coupling loops link the cores in series configuration in horizontal rows and in series configuration in vertical columns, a pair of clearing windings linking each core, means for shifting information horizontally in each row including means for simultaneously pulsing one of the clearing windings in each core of alternate columns of cores, means for simultaneously pulsing one of the clearing windings of each core in the remaining columns of cores, means for simultaneously applying a current pulse through the coupling loops linking the cores in the said alternate columns with the cores in said remaining columns, means for simultaneously applying a current pulse through the coupling loops linking the cores in said remaining columns with the cores in the said alternate columns, and means for shifting information vertically in each column including means for simultaneously pulsing one of the clearing windings in each core of alternate rows of cores, means for simultaneously pulsing one of the clearing windings of each core in the remaining rows of cores, means for simultaneously applying a current pulse through the coupling loops linking the cores in said alternate rows with the cores in said remaining rows, and means for simultaneously applying a current pulse through the coupling loops linking the cores in said remaining rows with the cores in the said alternate rows.

12. A shift register comprising an even number of cores of magnetic material having a substantially rectangular hysteresis loop, each core defining a closed magnetic circuit and having at least two apertures, each aperture splitting the magnetic circuit of the core into two branches, a plurality of coupling loops, each coupling loop linking one branch of each of the magnetic circuits defined by two adjacent cores, the loops linking the branches through an aperture in each of the adjacent cores, means for simultaneously saturating alternate ones of said cores, means for simultaneously pulsing a current of predetermined magnitude through alternate ones of said coupling loops, means for simultaneously saturating the remaining intermediate cores, and means for simultaneously pulsing a current of predetermined magnitude through the remaining intermediate coupling loops.

13. Apparatus as defined in claim 12 further including means for setting the flux in opposite directions in the two branches associated with each of the two apertures in selected ones of alternate cores.

14. Apparatus as defined in claim 12 wherein each of the means for pulsing current through the two groups of coupling loops includes means for limiting the current of the pulses to a value just sufficient to bring the linked magnetic circuits when saturated to a magnetization level at which a material portion of the saturating flux can start to reverse direction.

15. Apparatus for storing and transferring binary information comprising at least two annular magnetic cores of magnetic material having a substantially rectangular hysteresis loop, each of the cores having at least two apertures extending through the core material, a transfer loop including two windings in parallel, the windings respectively linking one aperture in each of the two cores, and means for coupling a transfer pulse to the transfer loop, the magnitude of the pulse being such as to produce a current in each of the windings that is slightly less than the threshold current level required to switch flux in the associated cores when all the flux is set in one direction around the annular cores.

16. Apparatus as defined in claim 15 wherein one winding of the transfer loop has a greater number of turns than the other winding, and further including means responsive to a clear pulse for setting all the flux in one direction in the core having the winding of smaller number of turns, and means for successively generating the clear pulse and the transfer pulse, whereby information is read out of the core having the winding of larger number of turns to the core having the winding of smaller number of turns.

17. A magentic core logic circuit comprising a transmitting core element and a receiving core element of magnetic material having a substantailly rectangular hysteresis loop, each core element having a large central aperture defining a relatively long closed flux path and pair of small apertures defiining relatively short closed flux paths, each of the small apertures dividing the relatively long flux path into two parallel branches, a closed conductive loop including a first conductive winding linking one of said parallel branches of the transmiting magnetic core element through one of the small apertures and a second conductive winding linking one of said parallel branches of the receiving magnetic core element through one of the small apertures, means including a winding linking the relatively long flux path of the receiving core element through the large central aperture for setting all the flux around the relatively long flux path of the receiving core element and blocking the two small apertures, and means for pulsing a transfer current through the two small apertures of the respective core elements linked by the windings of the closed loop, the current being below the threshold required to switch flux around the relatively long flux paths of the core elements when the small apertures linked by the closed loop windings are blocked, whereby the small apertures of the receiving core element are unblocked by the transfer current pulse only if the small apertures of the transmitting core element are unblocked.

18. A magnetic core logic circuit comprising a transmitting core element and a receiving core element of magnetic material having a substantially rectangular hysteresis loop, each core element having a large central aperture defining a relatively long closed flux path and pair of small apertures defining relatively short closed flux paths, each of the small apertures dividing the relatively long flux path into two parallel branches, a closed conductive loop including a first conductive winding linking one of said parallel branches of the transmitting magnetic core element through one of the small apertures and a second conductive winding linking one of said parallel branches of the receiving magnetic core element through one of the small apertures, means including a winding linking the relatively long flux path of the receiving core element through the large central aperture for setting all the flux around the relatively long flux path of the receiving core element and blocking the two small apertures, and means for pulsing a transfer current through at least one of the apertures of the respective core elements linked by the windings of the closed loop, the current being below the threshold required to switch flux around the relatively long flux paths of the core elements when the small apertures linked by the closed loop windings are blocked, whereby the small apertures of the receiving core element are unblocked by the transfer current pulse only if the small apertures of the transmitting core element are unblocked.

19. Apparatus as defined in claim 18 wherein the transfer current pulsing means includes a pair of windings in series, the windings linking the same small apertures of the two core elements as the windings of the closed conductive loop.

20. Apparatus as defined in claim 18 wherein the transfer current pulsing means includes only a single winding linking one of the small apertures linked by the closed conductive loop.

21. Apparatus as defined in claim 18 wherein the transfer current pulsing means includes means for passing the transfer current directly through the windings of the closed conductive loop.

22. A shift register circuit comprising a plurality of binary magnetic core elements each composed of magnetic material having a substantially rectangular hysteresis loop characteristic, there being a pair of core elements for each binary bit stored in the register with one shift cycle transferring the binary bit stored magnetically in one core element of a pair to the other core element of the same pair and then to one core element of the next pair of core elements, each core element having a large central aperture defining a relatively long flux path in the core element and further having at least one small aperture spaced from the central aperture, each defining a relatively short flux path, a winding passing through the large aperture of each core element and linking the relatively long flux path thereof, the windings associated with said one core element of each pair of core elements being connected in series circuit relationship, the said windings associated with said other core element of each pair of core elements being connected in series circuit relationship, whereby two series connected winding circuits are provided, means for pulsing a unidirectional current through one of said series circuits to cause said one element of each pair of elements to assume one stage of magnetization, means for pulsing a unidirectional current through the other of said series circuits to cause said other element of each pair to assume one state of magnetization, means coupling the core elements in a chain including a plurality of closed wire loops having high conductivity to current in both directions around the respective loops, each loop extending through and linking each of a pair of adjacent core elements in said chain through one of said apertures in each such core element, a second winding through at least one small aperture of each core element, and additional means for pulsing a unidirectional current through at least one of the apertures in each pair of cores linked by each of the loops, the current from the additional current pulsing means being limited in magnitude to produce switching of flux only around the short flux path but not sufficient to switch flux around the long flux path of the associated core element.

23. A shift register comprising a plurality of magnetic core elements of magnetic material having a substantially rectangular hysteresis loop, each core element having a large aperture defining a relatively long flux path in the core element and further having a plurality of small apertures, each small aperture defining a relatively short flux path in the core element, a plurality of closed coupling loops having a high conductivity to current in either direction around the loops with each coupling loop linking a pair of core elements, whereby the core elements are linked in a chain by the loops, each loop including a portion passing through an aperture in one core of the pair linked by the loop and a portion passing through an aperture in the other core of the pair linked by the loop, whereby each loop links flux around the paths formed by the respective apertures, each core including an additional winding having turns passing through the large aperture and linking the long flux path around the large aperture, means for pulsing a unidirectional current through each of the additional windings, and means for pulsing a unidirectional current through the aperture of each core linked by one of said loops.

24. Apparatus as defined in claim 23 wherein the additional windings of alternate cores in the chain are connected in series, and the additional windings of the remaining cores are connected in series to form two series circuits.

25. Apparatus as defined in claim 23 wherein the means for pulsing a unidirectional current through the aperture of each core linked by a loop is current limited to permit switching of flux around the short flux path formed by a small aperture but not around the long flux path formed by a large aperture.

26. Apparatus as defined in claim 23 wherein at least one of the core elements includes an additional output winding linking the core element through one of the small apertures.

References Cited by the Examiner

UNITED STATES PATENTS

| | | | |
|---|---|---|---|
| 2,810,901 | 10/57 | Crane | 340—174 |
| 2,935,739 | 5/60 | Crane | 340—174 |
| 2,936,445 | 5/60 | Bennion et al. | 340—174 |
| 2,969,524 | 1/61 | Bennion | 340—174 |
| 3,004,244 | 10/61 | Crane | 340—174 |

IRVING L. SRAGOW, *Primary Examiner.*

NEIL C. READ, *Examiner.*

UNITED STATES PATENT OFFICE

CERTIFICATE OF CORRECTION

Patent No. 3,204,223 August 31, 1965

Hewitt D. Crane

It is hereby certified that error appears in the above numbered patent requiring correction and that the said Letters Patent should read as corrected below.

Column 5, line 19, for '"unlocked,"' read -- "unblocked," --; column 17, line 66, for "stage" read -- state --.

Signed and sealed this 31st day of May 1966.

(SEAL)
Attest:

ERNEST W. SWIDER
Attesting Officer

EDWARD J. BRENNER
Commissioner of Patents